(12) United States Patent
McDowall et al.

(10) Patent No.: US 9,581,821 B2
(45) Date of Patent: Feb. 28, 2017

(54) HEAD MOUNTED AUGMENTED REALITY DISPLAY

(71) Applicant: Fakespace Labs, Inc., Mountain View, CA (US)

(72) Inventors: Ian McDowall, Mountain View, CA (US); Mark Bolas, Mountain View, CA (US)

(73) Assignee: Fakespace Labs, Inc., Mountain View, CA (US)

( * ) Notice: Subject to any disclaimer, the term of this patent is extended or adjusted under 35 U.S.C. 154(b) by 0 days.

(21) Appl. No.: 14/749,568

(22) Filed: Jun. 24, 2015

(65) Prior Publication Data

US 2015/0370074 A1    Dec. 24, 2015

Related U.S. Application Data

(60) Provisional application No. 61/998,306, filed on Jun. 24, 2014.

(51) Int. Cl.
*G02F 1/1335*    (2006.01)
*G02B 27/01*    (2006.01)
*G02B 5/30*    (2006.01)

(52) U.S. Cl.
CPC ..... *G02B 27/0172* (2013.01); *G02B 27/0101* (2013.01); *G02B 5/3025* (2013.01); *G02B 5/3083* (2013.01); *G02B 2027/013* (2013.01); *G02B 2027/0118* (2013.01)

(58) Field of Classification Search
CPC .......................... G02B 27/0172; G02F 1/1313
USPC .......................................................... 349/11
See application file for complete search history.

(56) References Cited

U.S. PATENT DOCUMENTS

| | | | |
|---|---|---|---|
| 6,243,207 B1 * | 6/2001 | Kawamura | G02B 27/01 248/917 |
| 2004/0057138 A1 * | 3/2004 | Tanijiri | G02B 5/10 359/868 |
| 2013/0016292 A1 * | 1/2013 | Miao | G02B 27/283 349/11 |

* cited by examiner

*Primary Examiner* — Lucy Chien
(74) *Attorney, Agent, or Firm* — K. David Crockett, Esq.; Paul J. Backofen, Esq.; Crockett & Crockett, PC

(57) ABSTRACT

Compact and low mass augmented and fully virtual head mounted display designs are disclosed. The disclosed displays employ a display located between the eye and the main optical element of the head mounted display. These designs additionally afford the ability to support augmented reality displays because the user can see both the virtual image from the display and the real world if desired. The designs use semi-transparent displays where either the display emits circularly polarized light or the displays which emits light from one surface or the view of the display directly from the eye is obscured.

6 Claims, 4 Drawing Sheets

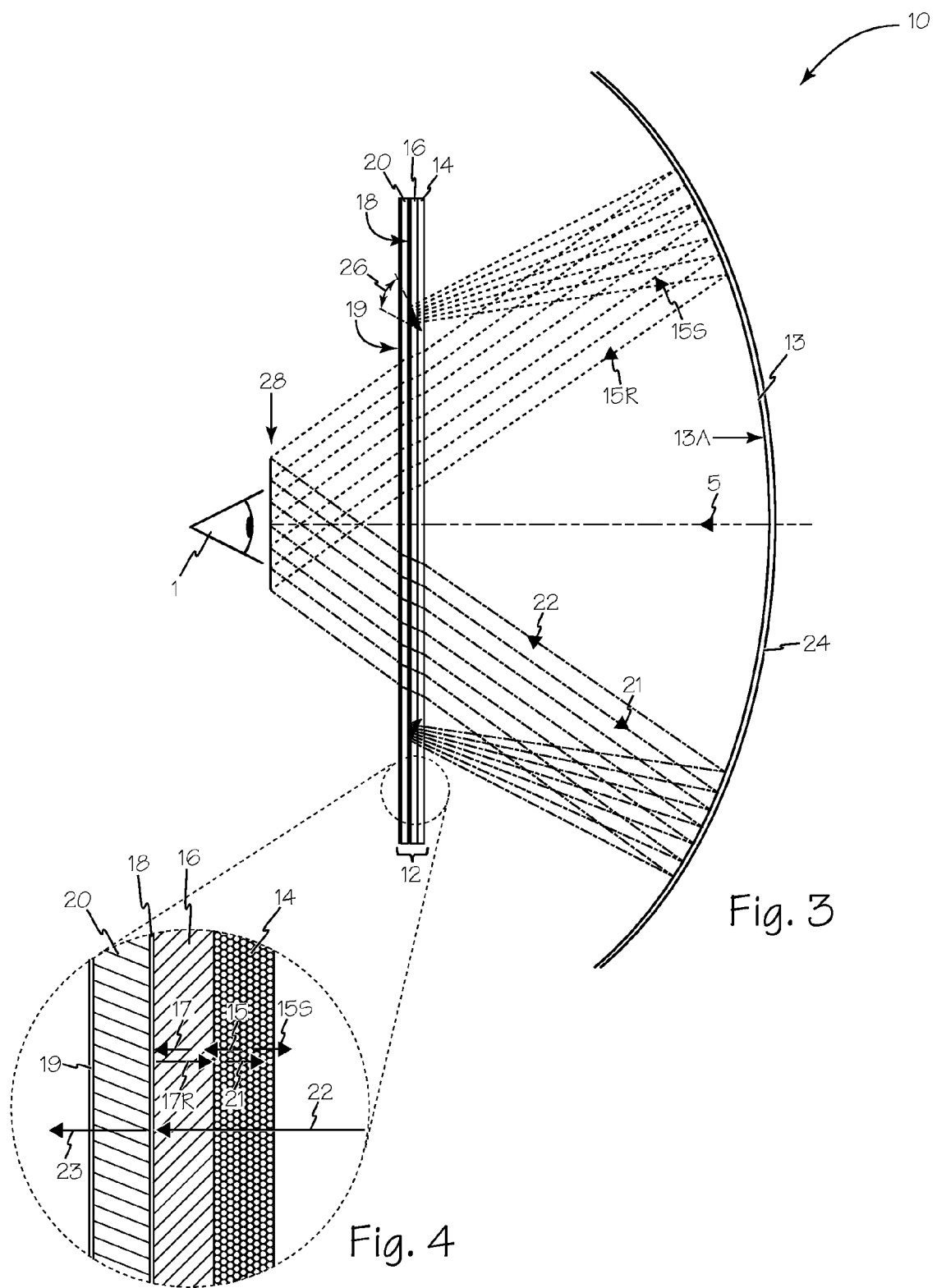

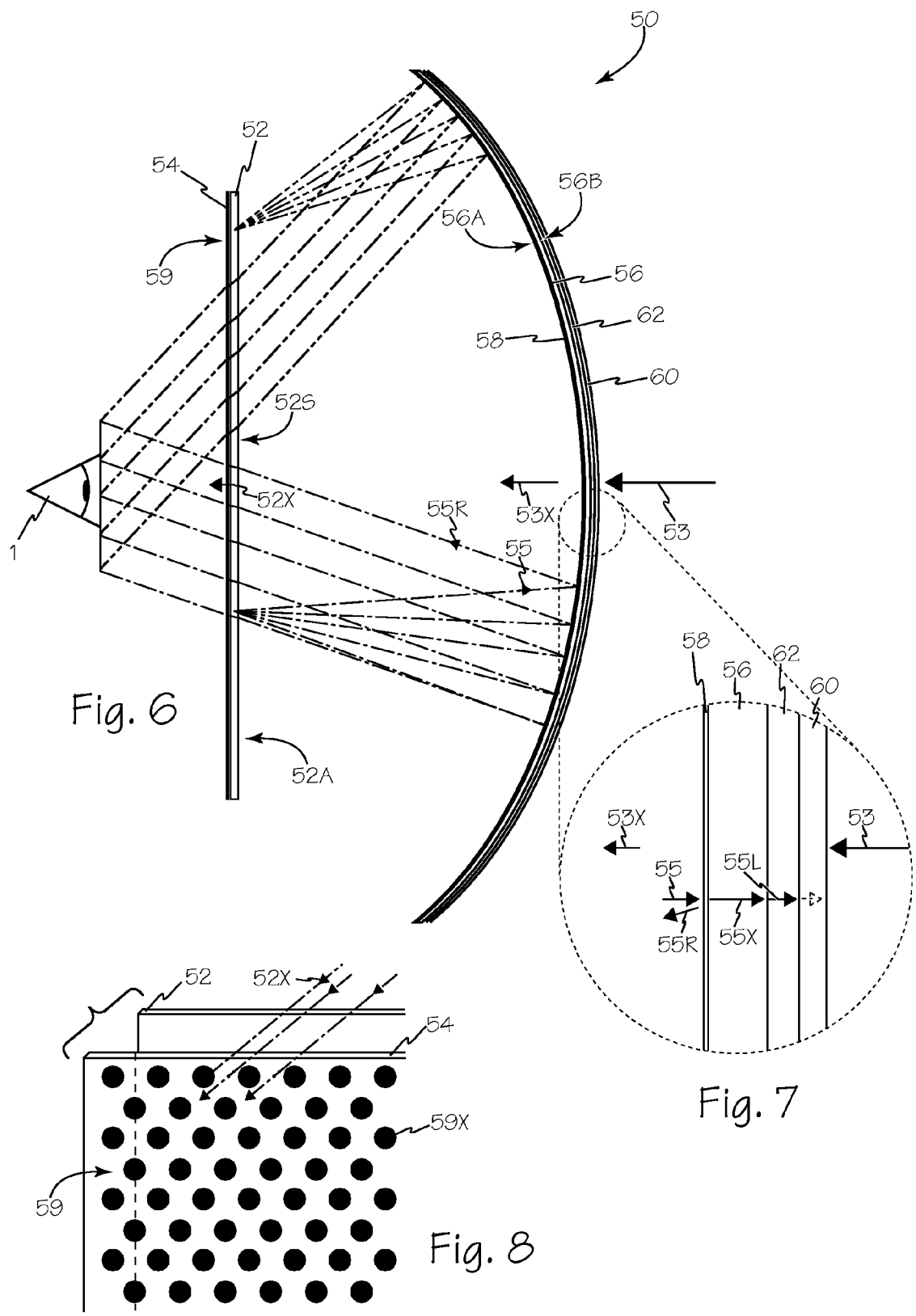

HEAD MOUNTED AUGMENTED REALITY DISPLAY

This application claims priority to provisional patent application 61/998,306 filed Jun. 24, 2014.

FIELD OF THE INVENTIONS

The inventions described below relate to the design of augmented and virtual reality head mounted displays and particularly displays which use reflective optics to create a virtual image to be seen by a user, often in stereo with a separate image for each eye.

BACKGROUND OF THE INVENTIONS

One approach for head-mounted virtual reality displays has been to use a Ferrand Pancake Window™ as described in U.S. Pat. No. 3,443,858 and follow-on devices which simply make the design more light efficient. This design is shown in FIG. 1. Underlying this design is the recognition that a curved mirror can be used to achieve short focal lengths with large diameters thus offering wide fields of view. Additionally, the pancake window can be made to be semi-transparent by replacing the display with a 45 degree 50% reflective mirror and additional optics in front of the display which is folded out of the optical path to form a real image of the display where the pancake is focused; the refractive path through the pancake and the 45 degree mirror offer a view into the real world and because the power from the pancake comes from the reflective surface, it can be buried in a plano-plano doublet or as an interior partially reflective surface. The optical path of the pancake window device uses circular polarization based mirror bounces to generate a virtual image of the display seen from the eye side of the optics. The eye sees light which was, during the optical path, traveling away from the eye.

SUMMARY

The devices and methods described below provide for an augmented or virtual reality head mounted display with the display interposed between the user's eye and a curved reflector. In this head mounted display system, positioning the display between the user's eye and the reflective element enables heavy optical components to be located closer to the user allowing a smaller display to provide a wide field of view. The curved reflector may be aspherical or spherical.

An augmented reality display includes a curved reflector and an optical stack oriented between the curved reflector and a user's eye. The optical stack consists of a display, a quarter wave plate and a reflective polarizer.

An augmented or virtual reality display may include two or more displays located at different distances from the user's eye while still remaining between the user's eye and the reflective optics. Multiple displays at different distances enable the user to perceive virtual images at different apparent distances from the user's eye. This configuration addresses the visual conflict between the eye's accommodation and vergence. Displays which address both accommodation and vergence feel visually 'correct'.

An augmented or virtual reality display may also include one or more elements such as a liquid crystal display to optically occlude, on demand, all or part of the real world. This real world occlusion can be turned on and off electronically. Such a configuration also enables the partial occlusion of the real world—for example enabling part of the real world to be dimmed and the virtual objects that reside at the angular position in the user's field of view to be brighter than the dimmed real world. Through careful manipulation of the relative brightness of the dimmed real world and the virtual one, a seamless mixed reality environment may be realized.

BRIEF DESCRIPTION OF THE DRAWINGS

FIG. 3 is a side view of the augmented reality head-mounted display of FIG. 2.

FIG. 4 is a detailed cross section of the optical elements of the display system of FIG. 3.

FIG. 6 is a diagram of an alternate display system.

FIG. 7 is a detailed cross section of the reflector and external optical elements of the display system of FIG. 6.

FIG. 8 is an exploded view of the optical elements of the augmented reality head-mounted display of FIG. 6.

DETAILED DESCRIPTION OF THE INVENTIONS

Figure 2:
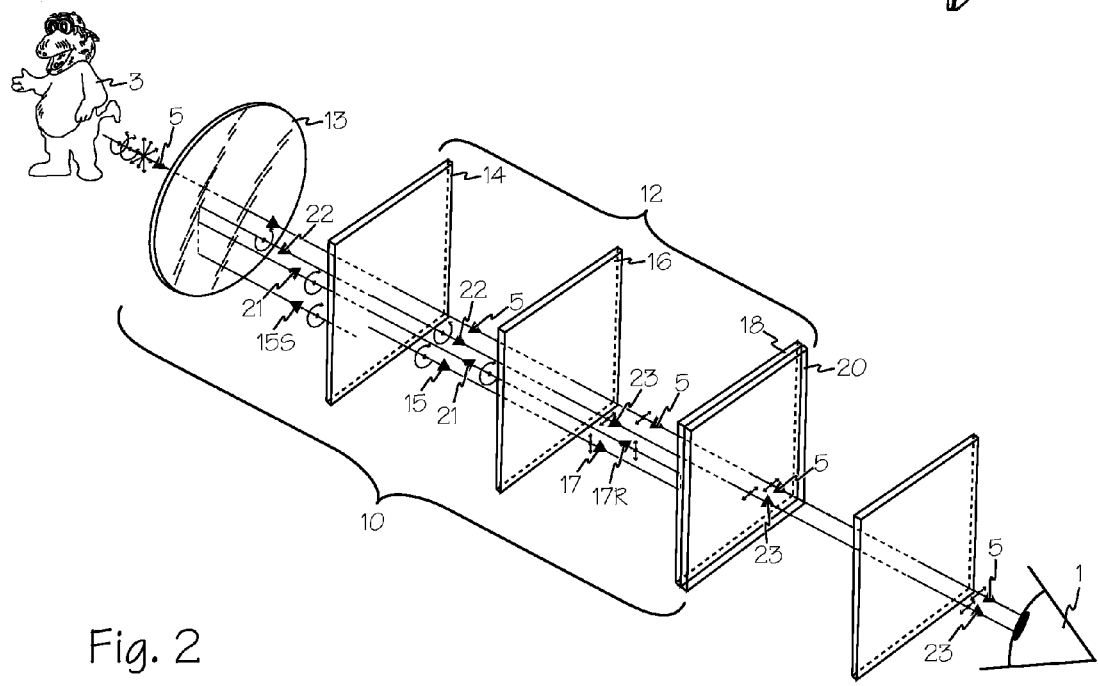
FIG. 2 is an exploded view of the optical elements of an augmented reality head-mounted display.

FIGS. 2, 3 and 4 illustrate augmented reality head-mounted display 10. Display 10 includes optical element and display stack 12 located between user's eye 1 and reflector 13 to permit the user to simultaneously view a portion of light 5 emitted or reflected from the real-world, such as from mascot 3, and a portion of light from the virtual world such as light 15 from emissive display 14. Reflector 13 may be any suitable curved reflector having a spherical or aspherical or compound shape. Emissive display 14 emits circularly polarized light 15 toward user eye 1. Emissive display may be any suitable emissive display which emits light from its surface (or from within a sheet of material of less than a few millimeters thick). The actual construction of such a display might use organic light emitting diodes (OLED), light emitting diodes (LED) or any other suitable means to produce a plurality of light emitting elements which can be arranged as a generally transparent element on a substantially locally continuous surface such as an edge-illuminated element and a liquid crystal display (LCD). Emissive display 14 is also transparent or semi-transparent and that transparency can be either an overall general passing of light or may be more like a dot type beam splitter where there are small non transparent elements on a largely transparent substrate so that the overall effect is that the display does allow light to pass through it.

FIG. 3 illustrates a detailed cross section of the optical elements of display system 10 showing emitted light 15 passes through quarter-wave plate 16 becoming linearly polarized light 17. Polarized light 17 then reflects off reflective polarizer 18 on the surface of element 20 and reflected polarized light 17R passes back through quarter-wave plate 16 and is circularly polarized to have the same polarization state as light 15 that originally emanated from emissive display 14. Reflected and circularly polarized light 21 then passes through emissive display 14. Thus, secondary light 15S which emanates from emissive display 14 towards reflector 13 and the reflected and circularly polarized light 21 (having traversed quarter-wave plate 16 twice) have the same circular polarization and are thus indistinguishable. Reflected and circularly polarized light 21 as well as secondary light 15S then reflects from surface 13A and some portion (perhaps substantially all) is reflected as light 22. Reflector 13 is idealized. In practice, reflector 13 is formed to meet the visual performance goals, manufacturing constraints, and the industrial design.

Upon reflection from reflector 13 the handedness of light 15S and 21 are both reversed and they are illustrated as light 22 which now passes back through emissive display 14 and quarter-wave plate 16 becoming light 23 with a linear polarization orthogonal to light 17 and light 23 passes through reflective polarizer 18 and optical element 20 and can be seen by eye 1 at or near eye-box 28. In this way, the light passing through reflective polarizer 18 (and optical element 20) is light which has come from the display and has been reflected from the reflector 13. The proportion of light reflected by the mirrored surface can be adjusted from substantially all the light reflected to only a small portion of the light being reflected and adjusting that parameter allows the designer to control the relative brightness of the reflected display 14.

An optional absorbing linear polarizer, polarizer 19, may be included to allow only light with the sense of linear polarization associated with the light 23 to pass through and absorbs the other which largely arises from light which is reflected by the user's eye or enters the display from the eye side of the optics. The final linear polarizer such as polarizer 19 is optional. If reflective polarizer 18 has a dark surface with a protective layer, final absorbing polarizer 19 need not be used.

The thickness of emissive display 14, quarter-wave plate 16, reflective polarizer 18 and optical element 20 is arbitrary and for illustrative purpose, ideally some or all of these are formed as thin sheets, particularly quarter-wave plate 16. If there is a significant thickness to quarter-wave plate 16 then the light from the front and back sides of the display will be focused at slightly different places in space from the user's point of view. This is not a significant issue as quarter-wave films can be quite thin and the thickness they introduce may be beneficial for improving the visual feel of the display system.

In display system 10 and the systems described below which have linearly polarized light emerging to the user's eye, the contrast ratio can be somewhat improved by removing light which reflects off the viewers eye 1 back into the optical system and display. This may be accomplished by adding a quarter-wave plate to the final absorbing linear polarizer. Thus the linearly polarized light which passes towards the eye is circularly polarized and the reflected light returning from the eye will have some portion that is reversed in handedness which becomes orthogonally polarized relative to linear absorbing polarizer 19 and is thus absorbed.

An optional element such as LCD element 24 may be incorporated into or secured to reflector 13 to block light from the real world. LCD element 24 could be formed onto the surface of reflector 13 or separate from it. A suitable LCD element is composed of a plurality of pixels which are electronically controlled to adopt a transparent or an opaque state. LCD element 24 may be composed of polarizers, liquid crystal material, and a quarter-wave plate ideally affording the designer the ability to (based on the pixel matrix of the LCD element) to have light 5 from the real world pass through element 24 and either be absorbed by the polarizers of LCD 24 or to emerge through element 24 imparted with circular polarization indistinguishable from light 22 which passes through optical element and display stack 12 and into the eye 1.

Quarter-wave plates such as quarter-wave plate 16 are used in this description and in this context with an emissive display means that, when appropriately oriented, the quarter-wave plate converts linearly polarized light to substantially circularly polarized light and may be referred to as an achromatic quarter-wave plate. A suitable quarter-wave plate performs as a substantially achromatic quarter-wave plate over the entire range of wavelengths of interest or it behaves substantially as a quarter-wave plate for the wavelength ranges of interest or those emitted by the display. For example, if a display has primary colors of 460 nm, 510 nm, and 625 nm with these containing most of the emitted energy within a +/−5 nm range the quarter-wave plate might be designed either to be substantially achromatic (i.e. with some tolerance) over the range 455 nm to 630 nm or it might be designed only to induce a quarter-wave of retardance (+/− some tolerance) over the ranges of 455 to 465 nm; 505 to 515 nm; and 620 to 630 nm with the performance of the element either relaxed, undefined, or specified to some other degree of retardation in the other portions of the visible spectrum. Similarly, the performance of the quarter-wave plates will also be defined over some cone angle which will be selected based on the cone of emission from the display such as emission cone 26 in FIG. 3. In this description, quarter-wave plate is to be understood as a quarter-wave plate which performs that function over the wavelengths of interest, even if the word achromatic is absent.

Figure 1:
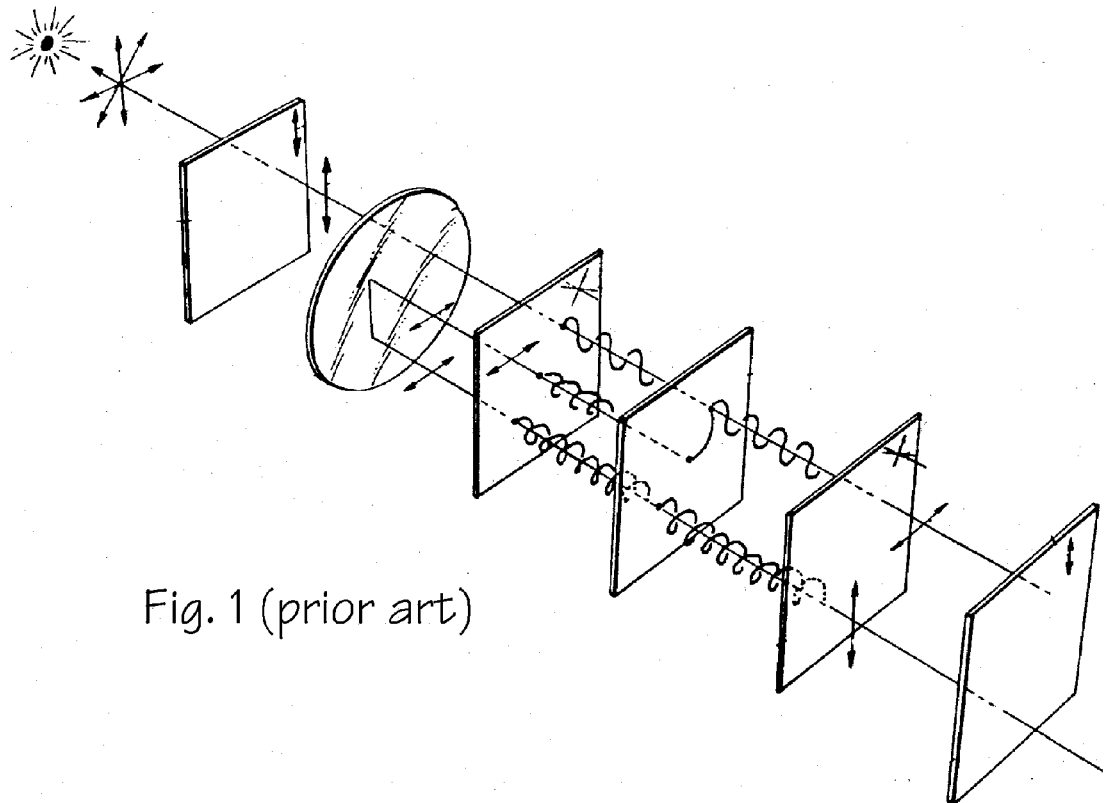
FIG. 1 is a prior art image-forming apparatus.

A reflective polarizer as discussed herein, such as reflective polarizer 18, has the property of reflecting one linear state of polarization and reflecting orthogonally polarized light. A suitable polarizer may be a wire grid polarizer such as those made by Moxtek or they may be implemented with a plastic film type material made by 3M and others with similar properties, or by other means which have substantially the same property of behaving substantially as a mirror to one linear polarization state and as a semi-transparent window to orthogonally polarized light. The disclosed wire grid polarizer or other similar element when combined with a quarter-wave plate makes a combined element which substantially reflects one state of circularly polarized light and substantially transmits orthogonally polarized light. This pair of elements may be replaced with any suitable single element which has the same properties with respect to circularly polarized light. Examples of such elements have been made with cholesteric liquid crystals for example and can be expected to be made using nano-fabrication techniques creating chiral meta-materials or chiral mirrors which reflect one circular polarization state and transmit the other for either a range of wavelengths in the visible or for selected relevant wavelength ranges. When the majority or substantially all the light from an emissive display is emitted toward the concave reflector or mirror, a linear polarizer is not required as illustrated with respect to FIG. 3A below. However, when the majority or substantially all the light from an emissive display is emitted toward the user's eye, a linear polarizer is required as illustrated in FIG. 1.

Display system 30 of FIG. 2 creates virtual images 31A, 31B and 31C at different apparent distances from user's eye 1 from the illustrated pencils of light from displays 32, 34 and 36. Circularly polarized light emanates from the eye side, sides 32E, 34E and 36E respectively, of emissive displays 32, 34, and 36 which are each oriented at different distances from user's eye 1, distances 33A, 35A and 37A respectively, as well as at different distances from reflective surface 38A, distances 33B, 35B and 37B respectively, to generate different virtual images 31A, 31B and 31C at different apparent distances from the user's eye. Emissive displays emit light with a very wide cone angle and the illustrations herein illustrate a pencil of emitted light which represents the light emitted from the display.

As discussed above, emitted light from each emissive display passes through achromatic quarter-wave plate 39 becoming linearly polarized light. The polarized light then reflects off reflective polarizer 40 on the surface of element 41 and the reflected polarized light passes back through quarter-wave plate 39 and is circularly polarized to have the same polarization state as the light that originally emanated from each emissive display. The reflected and circularly polarized light then passes back through each emissive display (32, 34 and 36). Thus, light 42 which travels toward reflector 38 is comprised of light from each of the three displays 32, 34 and 36 having reflected off surface 38A. Light 42 is illustrative of all the light from each of the displays and is circularly polarized light such as light 44 (having traversed quarter-wave plate 39 twice and reflected from reflective polarizer 40) have the same circular polarization and are thus indistinguishable. Reflected and circularly polarized light 42 then reflects from surface 38A and some portion (perhaps substantially all) is reflected as light 47. Similarly, light 44 is reflected as light 45. This description applies to light from all three emissive displays.

Upon reflection at surface 38A, the handedness of the light 42 and 44 is reversed in light 45 and 45 respectively. Light reflected from reflector surface 38A such as light 45 and 45 now passes back through emissive displays 36, 34 and 32 and quarter-wave plate 39 and on this pass it has a linear polarization state orthogonal to the light originally passing through quarter-wave plate 39 from the emissive displays. The light reflected from reflector surface 38A such as light 45 and 45 now passes through reflective polarizer 39 and optical element 40 and can be seen by user's eye 1 in eye-box 48.

Emissive displays 32, 34 and 36 are displaced from each other such that they form different virtual images as perceived by the user's eye at eye-box 48. The displays here are shown parallel to each other but the planes formed by the displays may be tilted if desired by tilting the display surfaces. To reduce inter reflections, the displays may be anti-reflection coated or the space between the displays may be filled with a transparent medium which index matches better than air; for example, if glass or plastics were used, they would likely be laminated to the displays.

In a simpler display, system light emanates from one face of a transparent display and travels through a substantially transparent material such as air, plastic, or glass to a partially reflective concave mirrored surface. The light is partly reflected at the mirrored surface and some light is lost. The reflected light passes back through the air or glass towards the display and then through the display to the viewer's eye.

Virtual display 50 of FIGS. 6, 7 and 8 employs an emissive display, display 52, which is generally transparent and emits light 55 from one face or surface, emissive surface 52S which is oriented with display 52 between emissive surface 52S and user's eye 1. Light 55 then encounters the interior surface 56A of concave reflector or mirror shell 56. Mirror 56 is shown as having thickness and the actual reflective/transmissive coating 58 is typically applied on the inside or interior surface 56A which affords some protection to the coating if the outside or exterior surface of 56B is the external surface of the display system. Light 55 impinges on reflective surface 58 and some portion of the light 55R; as determined by the reflective/transmissive characteristics 58X of reflective surface coating 58 is reflected back to the user's eye 1. Reflected light 55R passes back through display 52 which is largely or at least partially transmissive. Reflected light 55R may also (optionally) pass through occluding layer 54 which may provide a light blocking pattern of small opaque shapes 59X such as pattern 59 located such that any light from display 52 such as light 52X which emanates in the direction of the eye may be blocked from view. The position of the opaque shapes can be optimized to account for the parallax between the emissive element and the user's eye. The pattern of occluding shapes could be on a thin LCD formed on the eye side of the emissive display. Light blocking pattern 59 may also be any linear elements such as lines, or any other suitable shapes or combination of shapes. The pattern of opaque shapes may also preferentially block the light by adopting any suitable halftone pattern.

Reflective coatings such as reflective coating 58 or 38A may be applied to the inside or the outside of the curved shell such as shell 56. The thickness of shell 56 can vary for example, to account for the user's ophthalmic prescription. The reflective surface or coating can be wavelength tuned to match the spectral characteristics of the emissive display or displays and by tuning the ratio, one can achieve better relative brightness with a low power display by wasting less light. Additionally, the reflector shells may be formed as a Fresnel type reflector. Note that the surfaces of the reflector would optimally have facets which, from the eye's point of view are concentric.

Any of display systems 10, 30 or 50 may include one or more optical elements on the exterior of the reflector element as illustrated in FIGS. 6, 7 and 8. External optical elements such as linear polarizer 60 and a quarter-wave plate 62 properly polarize light from outside any of display systems 10, 30 or 50 and impinging external light such as light 53 of FIG. 3 will pass through linear polarizer 60 and quarter-wave plate 62 so that light 53X arriving from outside display system 50 has the same sense of circular polarization as light 55R reflected from the interior surface of the mirror. In that way, the optical systems are transmissive.

Figure 5:
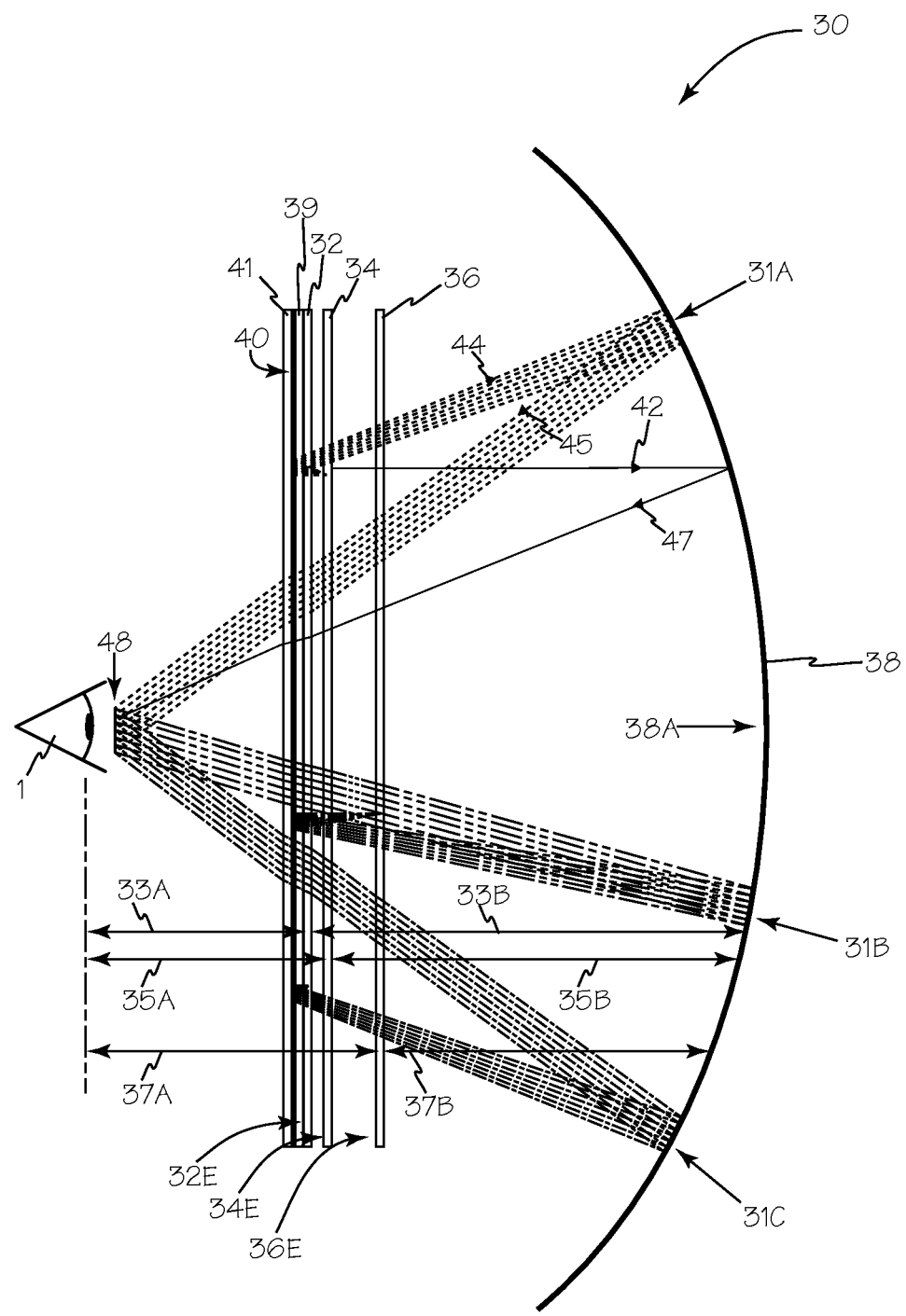
FIG. 5 is a diagram of a display system which creates virtual images at different apparent distances from the eye.

Polarization elements may be placed on the outside or exterior surface of the augmented reality display to allow external light in and to reduce the amount of light from the display that escapes through the reflector. Orienting the polarization elements on the outside requires curved reflector 56 to be interposed between the polarization elements and the user's eye. Light from inside the optical system, between the user's eye and the curved reflector, which passes through reflective mirror coating 58 such as light 55X must pass through quarter-wave plate 62 and will become linearly polarized light 55L which will be absorbed by external linear polarizer 60 on the outside of the system. Thus, from that side of the system little to no light from the display is visible. This same technique applies to the display shown in FIGS. 3, 4, and 5.

Similarly, augmented reality displays may use mirrors and partially transparent/partially reflecting mirrors. These optical elements may be implemented either with coatings such that their reflective/transmissive properties behave as substantially broadband devices in the visible spectrum over which the display illumination is relevant or may be constructed using coatings which are selective in terms of the wavelengths (technically selected ranges of wavelengths) of light where the particular reflective/transmissive behavior is tailored to match in some way the wavelength ranges emitted by the display.

Where present, the term concave mirror is to be understood that the detailed sag and shape of the surface and optical properties of that surface would be chosen to meet particular performance requirements in the product design. For example, the surface could be a simple spherical shape, an aspherical shape, or a free form optical surface and the designer would optimize the shape based on performance requirements such as field of view, manufacturing method, and the aesthetic requirements of the product design. The mirrored or reflective surface can be made as a concave shell, a concave shell with no optical power, or a prescription surface on the inside/outside surface. The surfaces and material can be selected and or made to account for vision of the individual person.

A display panel or emissive display emits light which is substantially circularly polarized with a particular handedness. The light emanating from the display passes through a circular polarizer and becomes linearly polarized. The linearly polarized light then is reflected by a mirror which reflects one state of linear polarization and passes the other. The linearly polarized light is thus reflected back towards the display and again passes through the quarter-wave plate and is circularly polarized with the same handedness as before. It then passes through the display panel which is largely transparent and emerges still circularly polarized with a particular handedness. The light then traverses through air, glass or plastic to a concave mirrored surface. At the mirrored surface, some light passes through and is lost, the other light is reflected and as a result of the reflection has the opposite sense of circular polarization. The light then passes through the display, which is largely transparent and then through the achromatic quarter-wave plate linearly polarizing the light with a linear state of polarization which is perpendicular to the linear state of polarization the light had initially at this surface and since the linear polarizer reflects only one linear state, this light is transmitted through the linear polarizer. The light then, optionally, passes through an absorbing type polarizer and emerges from the display system. Alternatively, the displays can be curved in a cylindrical form. Emissive displays such as displays 14, 32, 34, 36 and 52 may be any suitable light emitting display as discussed above with reflective/absorbing/interference creating/nano structures to force the light to emanate from one side.

An OLED type display on a thin substrate where the light emanates from both sides of the emissive material may be made to emit light primarily from a single side. For example, OLED displays have been made with patterns similar to a dot type beam splitter except the structure is described as using stripes instead of dots. For the applications described here, patterns of dots would be more advantageous and could be applied after the OLED is fabricated either by printing on the back surface of the OLED or laminating or joining without adhesive the OLED to a glass substrate with a pattern on it. The pattern can be further optimized for visual viewing. In particular, the dots can be small in the center of the field of view because there is no significant angle to the light emanating from the pixel and thus no path to the eye. In the periphery of the display, the slight thickness between the light emitting pixel and the blocking/reflecting element means the eye can look 'around' the blocking element so they should be radially offset, optimally elliptical, and slightly larger in area. Note also, in this type of display, the blocking elements should be absorbing in nature not reflective otherwise secondary reflections will be caused which will degrade the contrast ratio of the displayed image. So, while reflective will work, absorbing is preferred.

In each of the descriptions of the system, the emissive transparent display may be replaced with a stack of two or more such displays separated by glass, air, or another transparent medium. This substitution enables the display and optical system to place the images from each of the display panels at different apparent distances from the viewer's eye.

In the case where the curved mirror is partially transmissive to enable the user to see the real world and the images created by the display and optical system simultaneously, it may be advantageous to place a means to polarize the incoming light in a controlled way. This may be accomplished via the addition of a liquid crystal type panel which has a polarizer on the outside surface but does not have one on the inside surface. This enables a computer to control the polarization of the light from the real world. That incoming light may then be passed through an optional wide band achromatic quarter-wave plate if the light needs to be circularly polarized to be appropriately transmitted by the rest of the system. This enables the virtual images created by the system to be presented in combination with the real world where the real world may be spatially attenuated if desired. Some liquid crystal devices may be setup to directly impart the transmitted light with right or left handed polarization, in which case the function performed by the quarter-wave plate described above and be subsumed into the computer controlled device. This portion of the system would ideally be curved and manufactured into the outer surface of the curved reflector and would ideally have a shape such as to fit to the contours of the face and the industrial design of the display system.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. An augmented reality display comprising:
   a curved reflector;
   an optical and display stack oriented between the curved reflector and a user's eye, the optical stack comprising:
   two or more displays, each display at a different distance from the curved reflector;
   a quarter wave plate; and
   a reflective polarizer.

2. The augmented reality display of claim 1 wherein the curved reflector is partially reflective.

3. The augmented reality display of claim 1 wherein the curved reflector is reflective surface.

4. The augmented reality display of claim 1 wherein the curved reflector has an inside and an outside and the augmented reality display further comprises:
   an liquid crystal display on the outside of the curved reflector to spatially attenuate the real world.

5. The augmented reality display of claim 4 wherein one or more pixels of the liquid crystal display can be electronically switched between augmented reality mode in which a portion of the real world is seen along with virtual elements and virtual reality mode in which substantially only virtual elements are seen.

6. The augmented reality display of claim 1 wherein each of the two or more displays includes a plurality of light emitting elements and the augmented reality display further comprises:

a light blocking pattern which obscures the eye from seeing the light emitting elements of the two or more displays.

\* \* \* \* \*